United States Patent [19]

Trabert et al.

[11] Patent Number: 4,623,182

[45] Date of Patent: Nov. 18, 1986

[54] BUMPER FOR VEHICLE, ESPECIALLY MOTOR VEHICLES, AND METHOD OF MANUFACTURE

[75] Inventors: Hans-Gerhard Trabert; Claus P. Scharf, both of Rüsselsheim, Fed. Rep. of Germany

[73] Assignee: General Motors Corporation, Detroit, Mich.

[21] Appl. No.: 691,059

[22] Filed: Jan. 14, 1985

[30] Foreign Application Priority Data

Jan. 25, 1984 [DE] Fed. Rep. of Germany ....... 3402456

[51] Int. Cl.⁴ ..................... B60R 19/24; B60R 19/03; B60R 19/04

[52] U.S. Cl. .................................. 293/155; 293/122; 411/85; 411/107; 411/346; 411/401

[58] Field of Search .................. 293/120–122, 293/132, 136, 155; 411/84, 85, 107, 103, 340, 346, 401, 549, 550, 553, 908, 377

[56] References Cited

U.S. PATENT DOCUMENTS

| 2,714,754 | 8/1955 | Knohl | 411/553 |
| 4,270,591 | 6/1981 | Gill et al. | 411/103 |
| 4,354,566 | 10/1982 | Yuda | 293/155 |
| 4,391,464 | 7/1983 | Masotti et al. | 293/121 |
| 4,452,556 | 6/1984 | Nelson et al. | 411/377 |

FOREIGN PATENT DOCUMENTS

| 2708856 | 10/1977 | Fed. Rep. of Germany | 293/122 |
| 2702691 | 7/1978 | Fed. Rep. of Germany | . |
| 2756537 | 6/1979 | Fed. Rep. of Germany | 293/132 |
| 3020997 | 2/1982 | Fed. Rep. of Germany | 293/121 |
| 2477084 | 9/1981 | France | 293/120 |
| 298044 | 10/1928 | United Kingdom | 411/401 |

*Primary Examiner*—Robert B. Reeves
*Assistant Examiner*—Dennis H. Pedder
*Attorney, Agent, or Firm*—Charles R. White

[57] ABSTRACT

Bumper for motor vehicles consisting of two half-shell-shaped profile members made of synthetic material, which are connected at their end flanges by welding to form a closed hollow profile, and with fastening elements for attaching the bumper to the vehicle body, which are disposed on the half-shell-shaped profile member adjacent to the body, characterized by the fact that the profile member adjacent to the body has at each fastening point an opening with integral side locking arms and the fastening elements have molded counter-locking elements which can be releasably engaged with the locking arms.

3 Claims, 5 Drawing Figures

BUMPER FOR VEHICLE, ESPECIALLY MOTOR VEHICLES, AND METHOD OF MANUFACTURE

The invention relates to a bumper for vehicles, especially motor vehicles, comprised of two half-shell profile members made of a plastic material, which are joined at their respective end flanges by welding so as to form a closed hollow section, and wherein fastening elements, such as bolts or nuts, are provided which serve as means for mounting the bumper to the vehicle body, with said fastening elements being arranged on the half-shell member disposed adjacent to the vehicle body.

The manufacture of composite vehicle bumpers has been conventional practice in the industry. These bumpers are comprised of a metallic support member which is fastened directly to the vehicle body, and a plastic covering which is attached to the metallic support member and which, in some instances, is of the energy absorbing type.

A composite type bumper of this type has been disclosed, for instance, in German patent DE-PS No. 27 02 691. The plastic covering member in this patent is in the form of a hollow body which is open on the side adjacent to the body.

Another bumper of the composite type, which has been disclosed in German DE-OS No. 30 20 997, is fitted with an outer covering member made of a high-quality plastic material, and an inner liner of a lower grade plastic material. These two plastic covering members are retained in engagement with one another by clip devices, and the inner plastic liner can be attached onto the metallic bumper support member by snap fit engagement.

In an effort to save material, weight and costs in the construction of bumpers used for motor vehicles, especially passenger cars, the tendency in the recent past has been to dispense with the metallic support member altogether. As a result of this tendency, it has become necessary, for reasons of stability alone, to develop new design concepts which depart drastically from the earlier composite type bumper concepts. Modern bumpers of the type under consideration are in the form of closed box sections. They are manufactured on the basis of state-of-the-art techniques by using two extrusion molded half-shell members made of plastics which are joined at their end flanges by friction welding so as to form a closed box section. This state-of-the-art technique, which is described in the publication "The Use of Plastics in the Automobile Construction", published in 1983 by VDI, forms the basis of the present invention. Since this novel bumper member assembly no longer comprises a metallic support beam which is anchored to the vehicle body, suitable means had to be devised which would permit to fasten this unitized bumper, which is in the form of a plastic box section, to the vehicle body in a manner which not only ensures a reliable and stable connection, but which also permits removal of the bumper from the vehicle. The prior-art technique has been (see above literature reference) to fix the fastening elements (threaded bolts or nuts), prior to joining the two half-shell members by ultra-sonic welding, onto the half-shell member disposed adjacent to the vehicle body. However, experience has been that this technique has some serious drawbacks. One of the problems is the dimensional changes that occur during the friction welding operation in the profile member carrying the fastening elements (vibration problems). Another major drawback is the difficulty associated with repairing a damaged bumper. For instance, removal and replacement of the fastening elements is extremely difficult because of the inability to gain access to the inside of the closed box section. This means that the entire vehicle bumper must be replaced when, in some instances, only one of the bolts is damaged. Furthermore, once the two half-shell members are welded together to one unitized section, the position of the fastening elements, which are fixed to the member adjacent to the vehicle body, is not adjustable any more, which may lead to rejects in those instances where the fastening elements were initially improperly installed to that member of the bumper.

It is the object of this invention to provide means which permit a bumper of the foregoing type to be welded together to one closed box section without the need for preinstallation of metallic fastening elements inside said bumper, and thus without encountering vibrations which interfere with the welding operation. Furthermore, the novel manufacturing method also improves the repairability of the bumper with regard to the fastening elements and consequently makes for a customer-friendly bumper in terms of serviceability.

In accomplishing this object, the shaped half-shell member adjacent to the body is provided at each fastening location with an aperture having integrally formed lateral locking fingers. Furthermore, fastening members are provided which have counter-locking elements directly or indirectly formed thereto, with said counter-locking elements being adapted, after insertion of the fastening member into the aperture, for releasable latching engagement with the locking fingers.

This arrangement permits the fastening member to be inserted and fitted after the two half-shell members have been combined by welding into one box section. The ability of retrofitting the fastening elements also provides the benefits of facilitated shipping and storing, because the bulky fastening elements are initially absent from the assembly.

Another advantage to be realized by virtue of the releasable latching arrangement of the fastening elements with the locking fingers disposed on the associated profile member is that the fastening elements, after release of the latching engagement, can be removed at any time and, if necessary, replaced by new fastening elements, without the entire bumper becoming useless, as was the case in the prior-art arrangement.

In implementing the basic concept of the invention, it is proposed that each of the metallic fastening elements be integrally formed onto a plastic fastening member which is provided with lateral counter locking elements, and that the locking fingers be in the form of clip devices of the type having inwardly directed hook-shaped ends with sloping contact surfaces.

The novel latching arrangement of the fastening elements and the associated bumper section is characterized by its ability to render the connection secure against inadvertent separation and, at the same time, provides easy disconnectability, which is accomplished in that the locking fingers are elastically spread apart by means of a suitable tool. According to a further feature of the invention, it is proposed that a pair of grooves be machined into the profile member of the bumper disposed adjacent to the body. Said grooves are to be located at the level of the lateral locking fingers, with each groove extending to the associated locking finger.

This arrangement facilitates insertion of a tool, such as a screw driver, to effect disengagement of the latching means.

In order to provide optimum transmission of pull between the bumper and its fastening elements, it is proposed that the fastening member be larger than the aperture in the plane in which the locking fingers and the cooperating counter-locking elements are located when in the assembled state, so that the backside of the profile member of the bumper section disposed adjacent to the body is being engaged from behind the fastening member in the vicinity of the aperture.

In accordance with a further feature of the invention, a method of manufacturing the subject bumper is characterized by the following steps to be executed in succession:

1. Welding of the two-half-shell profile members together into one closed box beam section.
2. Insertion of the fastening members carrying the fastening elements from the outside into the apertures provided in the half-shell profile member disposed adjacent to the vehicle body such that the counter-locking elements are initially positioned at a 90° angle with respect to the locking fingers.
3. Turning each fastening member at an angle of 90° until the counter-locking elements are in locking alignment and subsequent engagement with the locking fingers.

Other objects, features and advantages of the present invention will become aparent from the sub-claims and drawings as well as the following description, wherein exemplary embodiments are being illustrated and described in detail.

IN THE DRAWINGS

Figure 1:
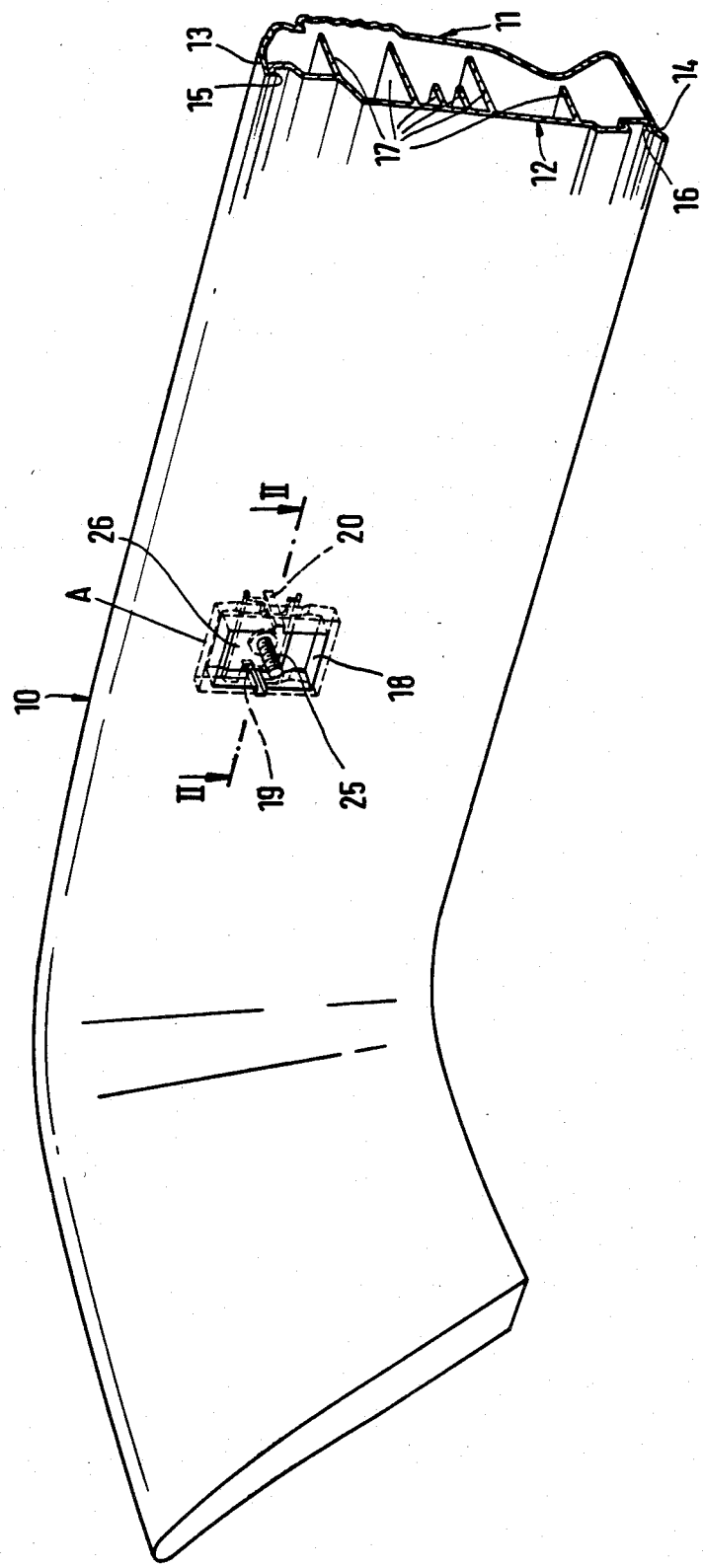
FIG. 1 is a perspective rear view of a portion of a passenger car bumper.

A bumper illustrated partially in FIG. 1 for use with a motor vehicle, especially a passenger car, is denoted by the numeral 10. The bumper according to the present invention is one that may be used as a front or a rear bumper. The bumper is comprised of two half-shell profile members 11, 12 which are made of plastics and which may be fabricated by the extrusion molding technique. Each of the two half-shell profile members is provided with top and bottom walls or flange-like edges 13, 14 and 15, 16, respectively at which the members are joined to one another by the friction welding process. The half-shell profile member denoted by the numeral 11 is the outermost member, whereas the one identified by the numeral 12 is the profile member of the bumper 10 that is disposed adjacent to the vehicle body. It is apparent from FIG. 1 that the profile member 12 adjacent to the vehicle body is provided with ribs 17 which serve as reinforcing means for the profile member 12 and which are adapted, in the event of an impact on the bumper to convert kinetic energy into deformation energy.

Figure 2:
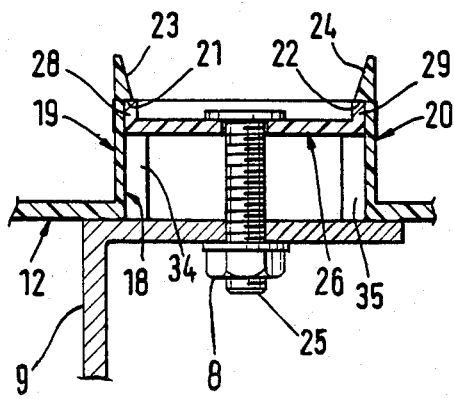
FIG. 2 is a sectional view (slightly enlarged) along line II—II of FIG. 1.

In order to be able to install the entire bumper 10 to the vehicle body (not shown), suitable means must be provided on the profile member 12 for the attachment of fastening elements which are to cooperate with respective fastening elements provided on the vehicle body. For this purpose, the profile member 12 disposed adjacent to the vehicle body is provided with a pair of rectangular apertures each having a different height than width which are disposed symmetrically with respect to the longitudinal axial centerline (not shown) of the bumper 10 which, for all practical purposes, corresponds to the longitudinal axial centerline of the vehicle. One of the two apertures is illustrated in FIG. 1 and denoted by the numeral 18. As apparent, especially from FIGS. 2 to 4, a pair of locking fingers 19, 20, one on each side, is formed onto the aperture 18 adjacent side walls thereof as seen in FIG. 2 and extends beyond the side walls to the inside of the closed hollow section of the bumper 10 formed by the two half-shell profile members 11, 12. The locking fingers 19, 20 are integrally formed onto the profile member 12 and are in the form of clip devices. They are provided with inwardly extending hook-shaped heads or ends 21 and 22, respectively, each of said ends being provided with angled engagement surfaces 23 and 24, respectively.

Each aperture 18 is adapted to cooperate with a metallic fastening element 25. The fastening element 25 illustrated in the exemplary embodiment is in the form of a threaded bolt which is adapted to cooperate with a nut 8 which secures the bumper to the side rail extension 9 of a vehicle. As apparent from the drawings, especially FIG. 2, the metallic fastening element 25 is embedded at one end into and extends through a fastening member 26 made of plastics. It is apparent from FIG. 1 and especially FIGS. 3 and 4, that the fastening member 26 is also of rectangular shape, and is shaped such to permit insertion of the same through the aperture 18 provided in the profile member 12 and into the closed, hollow bumper section 10 (see direction of arrow 27 in FIG. 3). As shown furthermore in FIGS. 2 to 4, the fastening member 26 has counterlocking elements 28, 29, one on each side, integrally formed thereto which when the locking member 26 is in the installed position, are adapted to cooperate with the pair of locking fingers 19, 20 of the profile member 12, said locking fingers being adapted to function as clip devices. The counterlocking or keeper elements 28, 29 are of substantially square configuration and their depth, as viewed in the direction of assembly (see arrow 27 in FIG. 3), corresponds to the distance between the hook-shaped ends 21, 22 of the locking fingers 19, 20 and the back, identified in FIG. 4 by the numeral 30 of the profile member 12, said back 30 serving as a retaining means for the fastening member 26. This arrangement ensures that when the fastening member 26 together with its fastening element 25 is in the installed position, as illustrated in FIG. 4, the connection between the fastening member 26 and the profile member 12 adjacent to the vehicle body, and consequently the bumper as a whole, is free of play.

Figure 3:
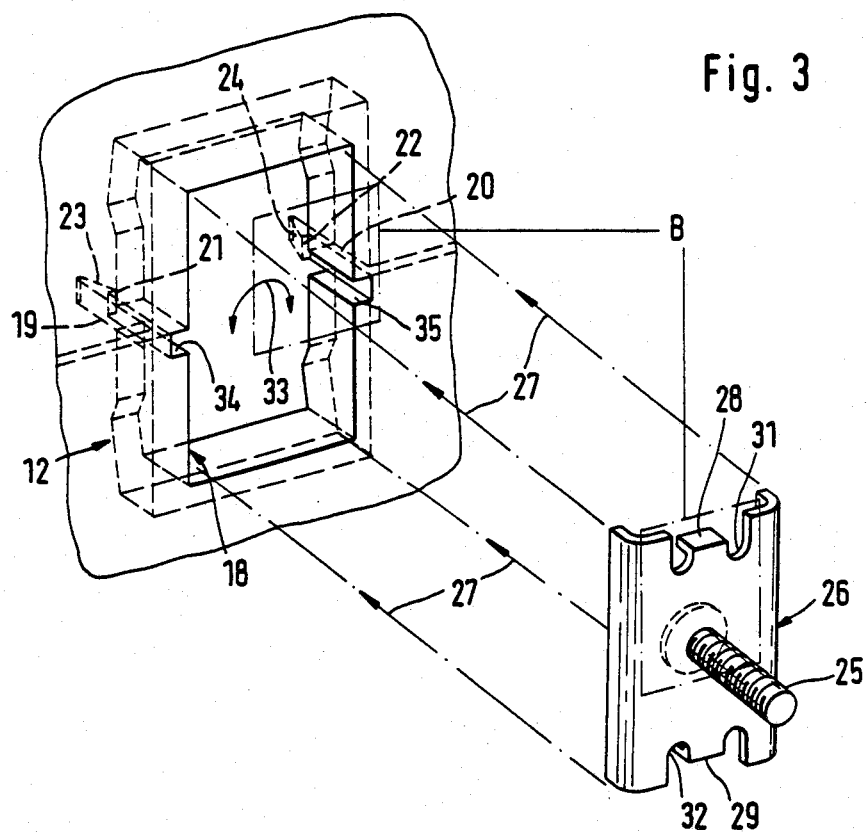
FIG. 3 is the section of the bumper identified in FIG. 1 by the letter A, illustrated on an enlarged scale relative to FIG. 1. The section shown in this Figure is an exploded view shown in perspective.
Figure 4:
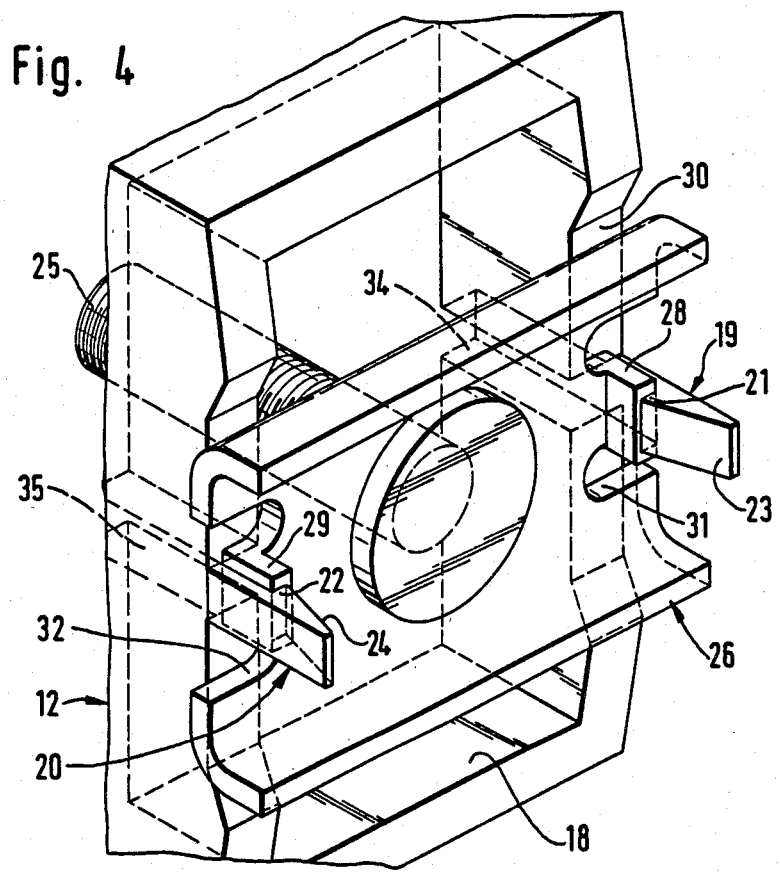
FIG. 4 is the subject matter of FIG. 3 shown in the assembled position. It is a perspective illustration as viewed at an angle from a point behind the subject matter, and illustrated, again, on an enlarged scale as compared to the illustration in FIG. 3.

Furthermore, it is apparent from FIGS. 3 and 4 that the plastic fastening member 26 is substantially U-shaped when viewed in cross-section, and that the counterlocking elements 28, 29, which are substantially square-shaped, are disposed in recesses 31, 32 provided on either side of the fastening member 26.

The installation of the fastening member 26 together with the metallic fastening element 25 occurs after the two half-shell profile members have been joined to one another by welding. The insertion of the fastening member 26 proceeds, as indicated in FIG. 3, in the direction of arrow 27, i.e., from the backside of the hollow bumper section 10 facing the vehicle body. The fastening member 26 is placed through the aperture 18 of the profile member 12 in an upright position. The height of the member 26 is greater than the width of aperture 18. Subsequently, the fastening member 26 is turned in the direction of arrow 33 at an angle of 90° and moved for the assumption of its final installation position illustrated in FIGS. 1, 2 and 4, until the counterlocking elements 28, 29 are in locking engagement with the locking fingers 19, 20. In this position, the fastening member 26 engages the profile member 12 from behind on both sides of the aperture 18, so that the removal of the fastening element without prior disengagement of the latching arrangement 19, 20; 28, 29 is not possible.

Figure 5:
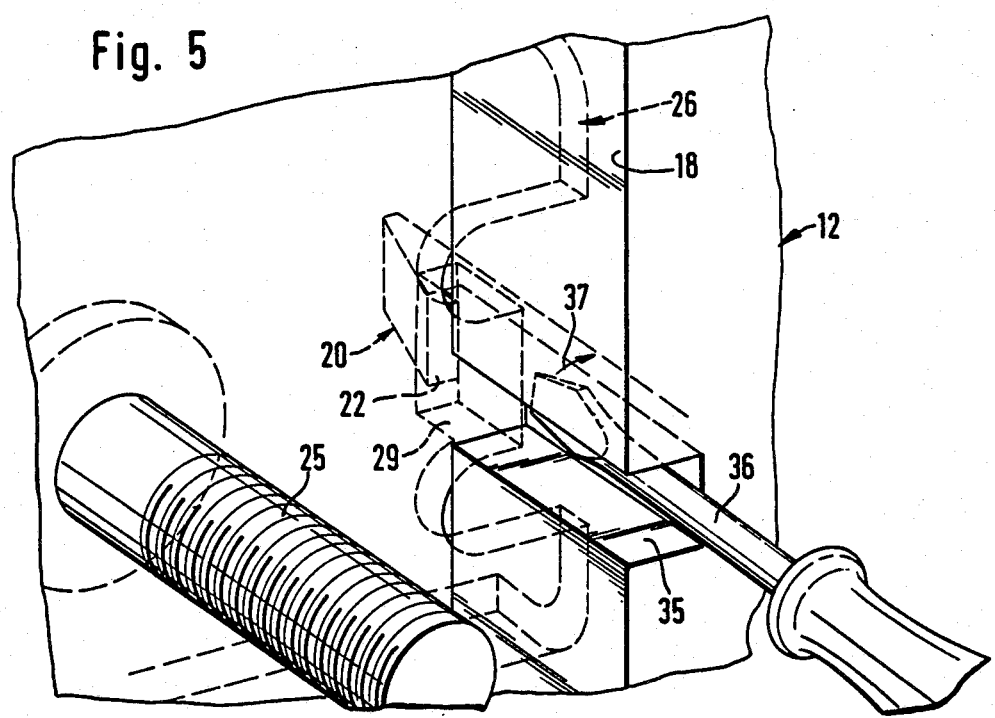
FIG. 5 is an enlarged fragmentary cross-sectional view from FIG. 3 (identified thereby the letter B), but illustrated here in the assembled position.

In order to effect removal of the fastening member 26 together with the fastening element 25, a procedure that may become necessary if the members 26, 25 have been damaged and therefore have to be replaced, a pair of grooves 34, 35 are machined in the profile member 12 at the level of the lateral locking fingers 19, 20 and are extending respectively, to said locking fingers 19, 20. As illustrated in FIG. 5, a suitable tool, in this instance a screw driver, can now be inserted into the grooves 34, 35. By exerting pressure with the tool 36 in the direction of arrow 37, the locking finger 20 is resiliently urged outwardly, whereupon the hook-shaped end 22 is caused to release the counterlocking element 29. The procedure is the same on the other side (not shown in FIG. 5). The fastening member 26 is now turned back in the direction of arrow 33 at an angle of 90° and can now be removed in the opposite direction of arrow 27 through the aperture 18 of the profile member 12.

SUMMARY

A bumper for vehicles, especially motor vehicles, which is comprised of two half-shell profile members made of a plastic material, which are joined at their end flanges by welding so as to form one closed hollow section, is provided with fastening elements (e.g. threaded bolts or nuts) for mounting the bumper to the vehicle body, with the fastening elements being attached to the half-shell profile member which is disposed adjacent to the vehicle body. The half-shell profile member adjacent to the vehicle body is provided at each mounting location with an aperture having laterally disposed locking fingers. The fastening members are provided with counterlocking elements which are directly or indirectly formed thereto and which are adapted subsequent to insertion of the fastening member through the aperture of the half-shell profile member adjacent to the vehicle body, to enter into locking engagement with the locking fingers.

One significant advantage exhibited by a bumper of this type is that the fastening elements can be installed after the two half-shell profile members have been joined by welding to another to form one closed hollow bumper section. A further advantage of the arrangement is that the fastening elements, if damaged, can be removed again at some later time and, if necessary, be replaced by new fastening elements.

The embodiments of the invention in which an exclusive property or privilege is claimed are defined as follows:

1. A bumper assembly for an automotive vehicle comprising an elongated impact shell having outer and inner faces spaced from and connected to one another by top and bottom walls, said inner face having a window therethrough having differing and predetermined height and width dimensions, said window being bounded by wall means extending into said shell, a fastener assembly for attaching said shell to a vehicle, said fastener having a main body and a threaded fastener extending therefrom, said main body having predetermined height and width dimensions less than the respective height and width dimensions of said aperture to permit said main body to be aligned with and axially inserted through said window into said shell and turned through a predetermined arc, a pair of opposing resilient fingers extending rearwardly from said inner face into said shell beyond the extent of said wall means, each of said fingers having a locking surface spaced a predetermined distance from the back surface of said wall means, and keeper means formed on opposite ends of said main body for engaging said locking surfaces to hold said main body against said wall means and releasably retain said fastener assembly on said shell.

2. A bumper assembly comprising an elongated hollow shell of plastic material for receiving impact loads, said shell having outer and inner faces spaced from and connected to one another by top and bottom walls, said inner face having at least one window therethrough, said window having differing and predetermined height and width dimensions, said window having wall means extending into the shell on opposite sides thereof, a fastener assembly for attaching said shell to a vehicle, said fastener assembly having a main body and a threaded fastener projecting therefrom, said main body having predetermined height and width dimensions less than the respective height and width dimensions of said window to permit said main body to be axially inserted into said shell and turned through a predetermined arc, said inner face having a pair of resilient fingers extending rearwardly therefrom into said shell to a predetermined distance from the back of said wall means, said fingers terminating in head means, each of said head means having a locking surface thereon spaced from and facing said wall means and keeper means formed on opposite ends of said main body for directly engaging said locking surfaces to releasably retain said fastener assembly on said shell.

3. A bumper comprising an elongated hollow shell of plastics material having outer and inner faces spaced from and connected to one another by top and bottom walls, said inner face having a rectilinear aperture therethrough having differing and predetermined height and width dimensions, said window having wall means extending into the shell along opposite sides thereof, a fastener assembly for attaching said shell to a vehicle, said fastener assembly having a rectilinear main body and a threaded fastener extending therefrom, said main body having predetermined height and width dimensions less than the respective height and width dimensions of said aperture to permit said main body to be axially inserted into said shell and turned through a predetermined arc, said height of said main body being greater than the width of said window, said shell having a pair of opposing resilient fingers extending rearwardly from said inner face into the shell beyond said wall means, each of said fingers having a locking surface on the end portion thereof, and keeper means formed on opposite ends of said main body of said fastener means for engaging said locking surfaces to thereby retain said fastener assembly on said shell and means resiliently attaching said fingers to said inner face adjacent to the sides of said window so said fingers can be deflected away from one another for disengagement from said keeper means to permit the subsequent rotation of said fastener assembly and the axial removal from said inner face of said shell.

* * * * *